United States Patent [19]
Phillips et al.

[11] Patent Number: 5,679,136
[45] Date of Patent: Oct. 21, 1997

[54] REDUCED FLUFF DRUM FILTER ENCLOSURE AND METHOD THEREOF

[75] Inventors: John Patrick Phillips, Auburn; Martin Alan Price, Snellville, both of Ga.

[73] Assignee: Osprey Corporation, Atlanta, Ga.

[21] Appl. No.: 514,916

[22] Filed: Aug. 14, 1995

[51] Int. Cl.⁶ .................... B01D 46/04; B01D 46/26
[52] U.S. Cl. .................. 95/277; 55/290; 55/301; 55/400; 55/418; 95/278
[58] Field of Search .............. 95/277, 278; 55/290, 55/301, 294, 351, 400, 431, 418

[56] References Cited

U.S. PATENT DOCUMENTS

| | | | |
|---|---|---|---|
| 1,680,977 | 8/1928 | Garner | 55/290 |
| 1,975,335 | 10/1934 | Smith | 55/400 |
| 2,328,220 | 8/1943 | Linderoth | 55/351 |
| 3,177,592 | 4/1965 | Meyer | 55/290 |
| 3,472,002 | 10/1969 | Brown | 55/272 |
| 3,483,675 | 12/1969 | King, Jr. | 55/290 |
| 3,628,313 | 12/1971 | Broadbent | 55/400 |
| 3,667,195 | 6/1972 | Angilly | 55/272 |
| 4,222,754 | 9/1980 | Horvat | 55/283 |
| 4,253,855 | 3/1981 | Jackson et al. | 55/351 |
| 4,360,432 | 11/1982 | Kieronski | 210/402 |
| 4,382,857 | 5/1983 | Laughlin | 55/290 |
| 4,427,422 | 1/1984 | Niederer | 95/277 |
| 4,481,021 | 11/1984 | Kinney | 55/290 |
| 4,531,890 | 7/1985 | Stokes | 416/187 |
| 4,654,059 | 3/1987 | Matyas | 55/283 |
| 4,689,143 | 8/1987 | Miers | 209/240 |
| 4,927,435 | 5/1990 | Anson | 95/278 |
| 5,181,945 | 1/1993 | Bodovsky | 55/290 |
| 5,474,598 | 12/1995 | Harpole, Jr. et al. | 95/277 |

*Primary Examiner*—Duane S. Smith
*Attorney, Agent, or Firm*—Jones & Askew, LLP

[57] ABSTRACT

A rotary drum filter having a reduced amount of fluff in the enclosure during operation. The volume of the enclosure and the mass flow rate of fluff coming into the enclosure are taken into account when determining a proper speed for the rotary drum so that fluff build up on the filter medium is reduced. By properly balancing these three items, fluff may be removed from the filter enclosure at a rate which is equal to or greater than the rate at which the fluff enters the enclosure. The structure of the rotary drum enclosure provides a high velocity, smooth air flow at the bottom of the filter enclosure. The incoming air and fluff are distributed over the entire length of the floor, so that turbulence is created along the length of the floor. In addition, the floor is curved so that there are no joining positions along the floor where dust can accumulate, and so all fluff entering the enclosure is blown to the top of the enclosure.

16 Claims, 4 Drawing Sheets

REDUCED FLUFF DRUM FILTER ENCLOSURE AND METHOD THEREOF

FIELD OF THE INVENTION

This invention relates in general to a rotary drum filter enclosure, and more specifically is directed to a drum filter enclosure which reduces the amount of fluff which remains in the enclosure during operation.

BACKGROUND OF THE INVENTION

The main absorbent part of most disposable sanitary products or disposable diapers is the pad, or core. The pad is often made of wood pulp that has been fiberized by a special mill, designed to handle fluffing pulp. After the pulp is fiberized, the resulting pulp fluff is drawn out of the mill onto a moving air forming screen, which is normally between 40–80 mesh. The pad is formed on the screen in a forming chamber, in which the pulp fluff is placed on the forming screen and is forced into a compact configuration by suction of air through the screen. After the pad is formed on the screen, it moves through a set of profiling rolls and on to the folding and packaging part of the converting machine.

The air that is pulled through the forming screen from the pulp mill contains small amounts of fiberized pulp fluff. Experience has shown that the amount of the waste fluff that comes through the forming screen is 2% or 3% of the total amount of fluff that enters the forming chamber.

Several filters have been developed for filtering the waste fluff out of the air exiting the forming chamber. These filters have several advantages. First, the filters clean the air that comes from the forming screen and return the air to the plant area or vent the air outside of the plant.

Second, the waste fluff that comes through the forming screen is recovered and returned to the mill or forming chamber. The recovered fluff that is returned to the process represents a substantial cost savings to the manufacturer.

For uniform pad formation to take place in the forming chamber, the volume of air moving through the forming chamber and the pressure of that air should be consistent. If the air volume or pressure is changed, the pad will have different thicknesses and absorbencies and may not meet specification. By assisting in moving air through the forming screen, a properly-constructed filter can help to assure air volume and air pressure consistency through the forming chamber.

Figure 1:
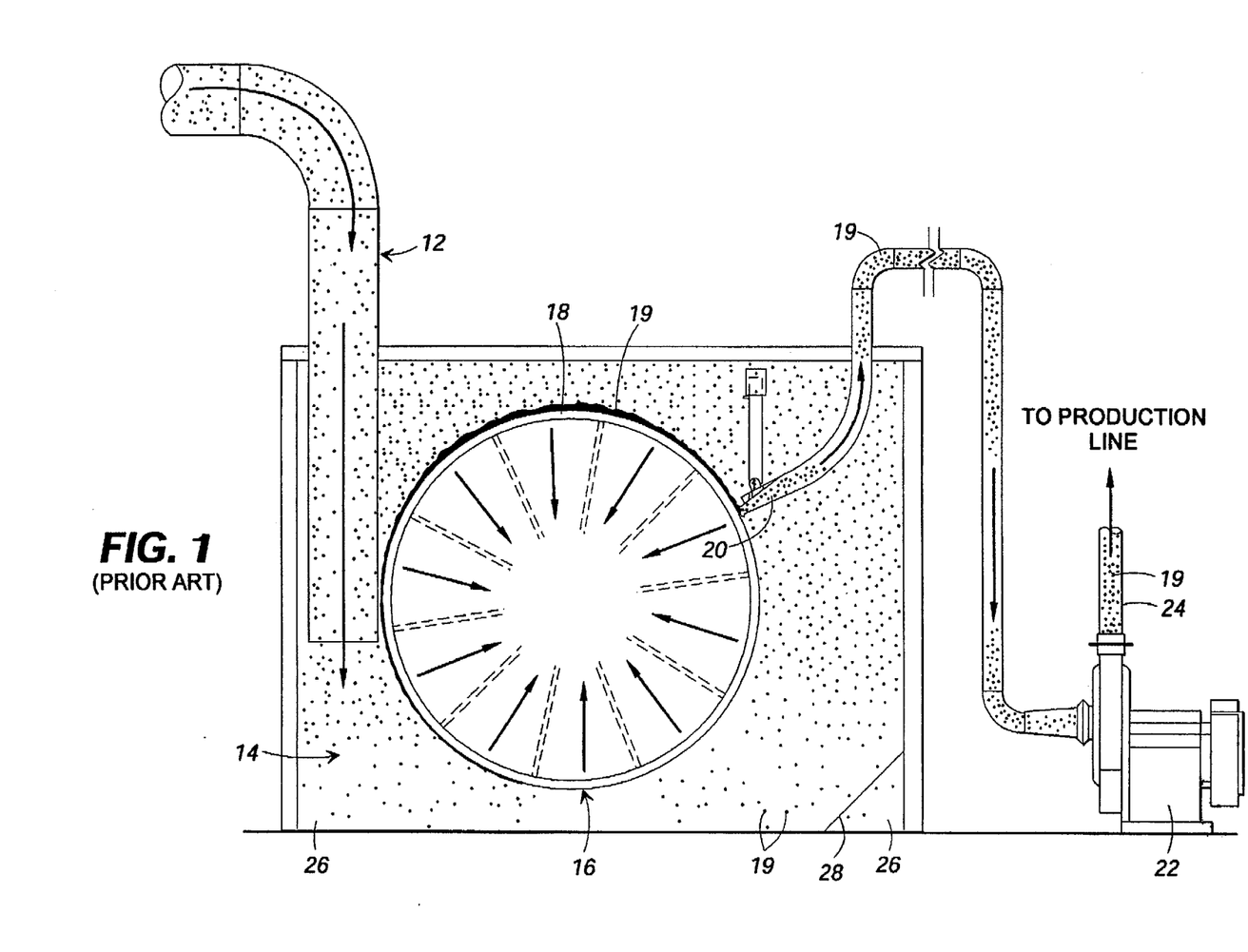
FIG. 1 is a side view of a prior art rotary drum filter, with part of the enclosure removed for detail.

One of the filters that is used for removing the waste pulp fluff from the air that moves through the forming screen is the rotary drum variety, such as is depicted in FIG. 1. As can be seen in FIG. 1, the process air from the forming chamber of the production machine with the waste fluff entrained is fed through a conduit 12 into a drum filter enclosure 14. The conduit 12 may feed the air and entrained waste fluff to the filter enclosure 14 from the top as shown or may deposit the air and entrained waste fluff from the forming chamber at an opening along the bottom of the filter enclosure 14. A rotary drum 16, which includes a filter medium 18 along its outside, rotates within the drum filter enclosure 14. One end of the rotary drum 16 is closed off (not shown in FIG. 1). The other end of the drum opens to a compartment (not shown in FIG. 1) which houses one or more clean air, or main, fans for withdrawing the air from the filter enclosure 14. The main fan (not shown in FIG. 1) is used to pull air through the filter medium 18 and then through the open end of the drum 16.

As the drum 16 rotates and as the clean air is pulled through the medium 18, pulp fluff 19 settles on the filter medium 18. This pulp fluff 19 is vacuumed off the filter medium 18 through a suction nozzle 20 by a purge fan 22. This fan 22 and another conduit 24 then route the fluff 19 back to the production line. The clean air, which is pulled through the filter medium 18 by the fans of the system, is returned to the plant area or is exhausted outside the plant.

The clean air fan, or main fan, is used at the open end of the rotary drum filter for pulling the fluff onto forming screen, pulling the waste fluff to the filter enclosure, and pulling the waste fluff onto the filter medium 18 of the drum filter. In addition, a material handling fan may be used to move the forming air and fluff from the mill through the forming chamber. The material handling fan, also known as a forming fan, is located on the conduit 12 extending from the forming chamber to the drum filter.

The drum filter enclosure generally can only handle approximately 12 inches water column (wc) of negative pressure. The material handling fan must be used if the forming chamber requires more than 8 inches wc of negative pressure. If a material handling fan is used in the forming chamber, then the fan at the rear end of the drum filter, or the clean air fan, is used as a balancing fan to keep the filter under a negative pressure. Because increasing forming chamber pressure is a common requirement of sanitary products machine manufacturers, material handling fans are often used to generate the required high pressures and volumes in a system. In such systems, the clean air fan located at the end of the rotary drum filter serves mainly as a balancing fan to keep the filter under negative pressure.

One of the problems found in the rotary drum filter systems is that waste fluff 19 has a tendency to accumulate in bottom corners 26 of the filter enclosure 14. Because of gravity, the waste fluff 19 has a tendency to remain in these corner areas. Further fluff 19 sticks to the accumulated fluff, and the problem is compounded. Manufacturers are often forced to shut down the line and clean out this fluff accumulation.

One manner of avoiding fluff accumulation in the corners 26 is by providing a baffle 28 in the corner of the enclosure to decrease the area in which fluff 19 can accumulate. Another method of preventing some of the fluff accumulation utilizes placement of the conduit 12 at the bottom of the enclosure 14. In this manner, a turbulent blast of air is created at the bottom of the filter enclosure, which somewhat prevents the accumulation of fluff 19 on the floor in places in direct contact with the turbulent air stream. At least one manufacturer has utilized more than one inlet across the bottom of the chamber in order to create an even more turbulent air flow. However, it has been found that this solution, even when used with a baffle, does not adequately solve the fluff accumulation problem.

Fluff accumulation can cause other problems in a filter system other than noncleanliness. The fluff 19 within the enclosure can act as fuel for a fire, or "explosion". Manufacturers have set limits for the amount of fluff 19 per unit volume that they consider a safe amount to be in the enclosure 14 at a given time. This limit is often referred to as the "lower explosion limit", or "LEL", and varies among different manufacturers. The limit is also referred to as the "lower flammability limit ("LFL")". Calculation of the limit may or may not include the fluff 19 located on the outside of the filter medium 18. However, regardless of the limit set, the fluff 19 accumulated at the bottom of the enclosure 14 and at the corners 26 of the enclosure is included in the calculation.

To prevent any possible explosions in a rotary drum enclosure from spreading to other parts of a plant, manufacturers often provide explosion vents (not shown) at the top of the enclosure 14. The explosion vents open when a certain pressure is built up within the enclosure 14. The vent provides an escape for igniting gases, and prevents an explosion from spreading to all parts of a plant. The explosion vent typically leads to a duct, which is vented to the outside of the plant. The duct usually leads from the explosion vent at the top of the enclosure up to and through the roof of the manufacturer's facility. The structure and installation of the explosion vent and its duct work can often be more elaborate and more expensive than the drum enclosure 14. Thus, manufacturers have searched for ways to avoid having to provide these explosion vents.

SUMMARY OF THE INVENTION

The present invention overcomes the foregoing problems by providing a drum filter enclosure which reduces the amount of fluff which remains in the enclosure during operation. The drum filter decreases the amount of fluff which accumulates in the enclosure in a number of different ways. First, the rotation of the drum is increased to match the fluff volume flowing into the enclosure. The volume of the enclosure and the mass flow rate of fluff coming into the enclosure are taken into account when determining a proper speed for the rotary drum so that fluff build up on the filter medium is reduced. By properly balancing these three items, fluff may be removed from the filter enclosure at a rate which is equal to or greater than the rate at which the fluff enters the enclosure. The suction nozzles actually clean the filter medium faster than the fluff can accumulate on the outside of the medium.

The present invention also provides a filter enclosure with no "dead spots", or places where fluff can accumulate within the filter. The present invention provides such a filter system by having a high velocity, smooth air flow at the bottom of the filter enclosure. The incoming air and fluff are distributed over the entire length of the floor, so that turbulence is created along the length of the floor. In addition, the floor is curved so that there are no joining positions along the floor where dust can accumulate, and so all fluff entering the enclosure is blown to the top of the enclosure. Also, the amount of area between the sides of the filter medium and the inner edges of the enclosure is reduced, and excess volume in the enclosure is provided above the rotary drum. By designing the enclosure in this manner, fluff in the air filter has a tendency to remain airborne or to settle on the medium before it returns to the floor.

More particularly described, the present invention provides a filter for separating a particulate from conveying air. The filter includes an enclosure defining a width, a length, a first side, a second side, a top side, and a floor therein, the floor defining an edge along the length of the first side of the enclosure. A rotary drum is contained within the enclosure and extends along the length of the enclosure, the rotary drum defining an outer circumference, the outer circumference defining a first side adjacent the first side of the enclosure, a second side adjacent the second side of the enclosure, a bottom located adjacent to the floor of the enclosure, and a top located adjacent the top of the enclosure. A filter medium is located on the outer surface of the rotary drum. A conduit is provided for depositing a particulate and air mixture into the enclosure adjacent to the edge of the floor, the conduit preferably depositing the particulate and air mixture substantially the length of the edge of the floor and positioned to direct the particulate and air mixture sequentially from proximate the first side of the enclosure, toward the floor, along the floor between the floor and the bottom of the rotary drum, up the second side of the enclosure between the second side of the enclosure and the second side of the rotary drum, and above the rotary drum between the top of the rotary drum and the top of the enclosure, so that the air carries the particulate from the conduit, around the rotary drum to the top of the rotary drum without the particulate accumulating against the enclosure. The floor is preferably concave and extends from below the drum up the second side of the enclosure. There may be one or two fans for the filter, a first fan for drawing the air and particulate mixture from the opening through the filter medium on the rotary drum and out of the enclosure, and a second, optional fan located on the conduit for depositing the air and particulate mixture at a flow volume.

The present invention also provides a method of operating the above described filter. The method steps involve determining a maximum amount of particulate to be in the enclosure at one time, calculating the first amount of time the first fan takes to deposit the maximum amount of particulate at the maximum flow rate of the particulate, and adjusting the rotation of the rotary drum such that the drum makes at least one complete rotation during the first amount of time.

Therefore, it is an object of the present invention to provide a rotary drum filter system which maintains a minimal amount of fluff in the filter enclosure during operation.

It is another object of the present invention to provide a rotary drum filter system which maintains turbulence across the majority of floor space in the drum filter so that fluff will not accumulate at the bottom of the filter.

It is still another object of the present invention to provide a rotary drum filter system which minimizes fluff which is blown around the drum filter and which returns to the floor.

Another object of the present invention is to provide a rotary drum filter system in which fluff is removed from the filter system at a rate which is equal to or greater than the rate in which the fluff enters the rotary drum filter system.

Yet another object of the present invention is to provide a rotary drum filter system in which the drum filter enclosure is matched to the air volume and fluff concentration of air flow into the enclosure.

Other objects, features, and advantages will become apparent upon consideration of the following detailed description of the invention when taken in conjunction with the drawing and the appended claims.

DETAILED DESCRIPTION OF THE PREFERRED EMBODIMENT

Figure 2:
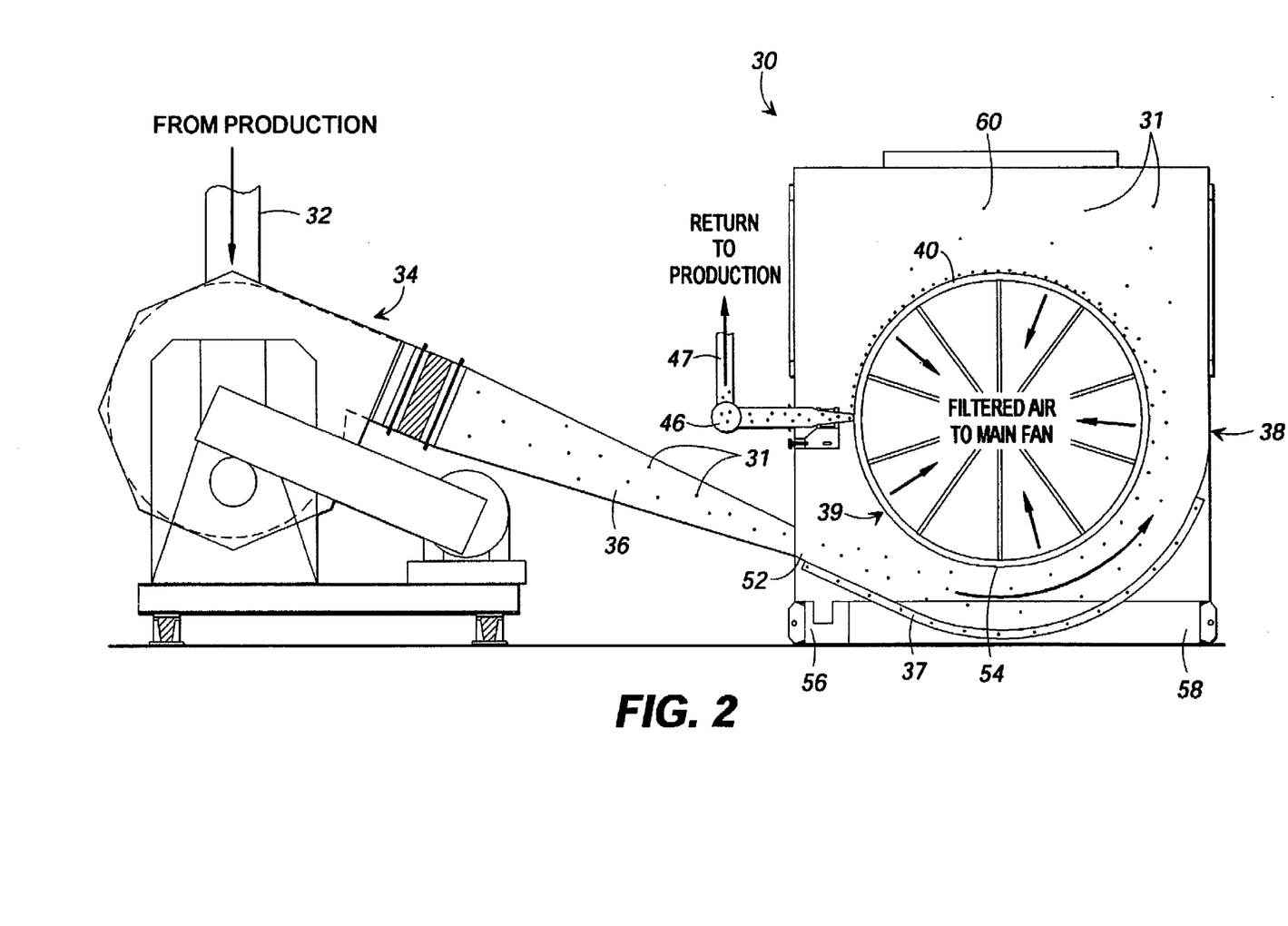
FIG. 2 is a side view of a forming fan and enclosure embodying the present invention, with part of the enclosure removed for detail.

Referring now to the drawing, in which like numerals represent like parts throughout the several views, FIG. 2 shows a drum filter enclosure 30 embodying the present invention. The figure displays the flow path of several fluff particles 31. The pulp fluff 31 and the air from the forming screen of the production machine are fed through a conduit 32 into a forming fan 34. The forming fan 34 is used to help move the air and fluff 31 from the mill through the forming chamber and into the filter enclosure 30.

The forming fan 34 blows the fluff and air through a conduit, herein referred to as a forming fan transition 36, into the filter enclosure 30 at a point near the floor 37 of the filter enclosure. The floor 37 is curved, or concave, and extends at least a portion of the way up one side 38 of the filter enclosure 30 opposite the forming fan transition 36, the function of which is described in detail below.

A rotary drum 39, which includes a filter medium 40 along its outer surface, rotates within the drum filter enclosure 30. A first end 41 of the rotary drum 16 is closed off (FIG. 3), and the other end 42 opens to a fan duct 43 leading to a balancing, or main, fan 44. The main fan 44 is used to move air through the open end 42 of the drum 39 and therefore through the filter medium 40. The rotary drum 39 is rotated by a drive motor 45.

Figure 3:
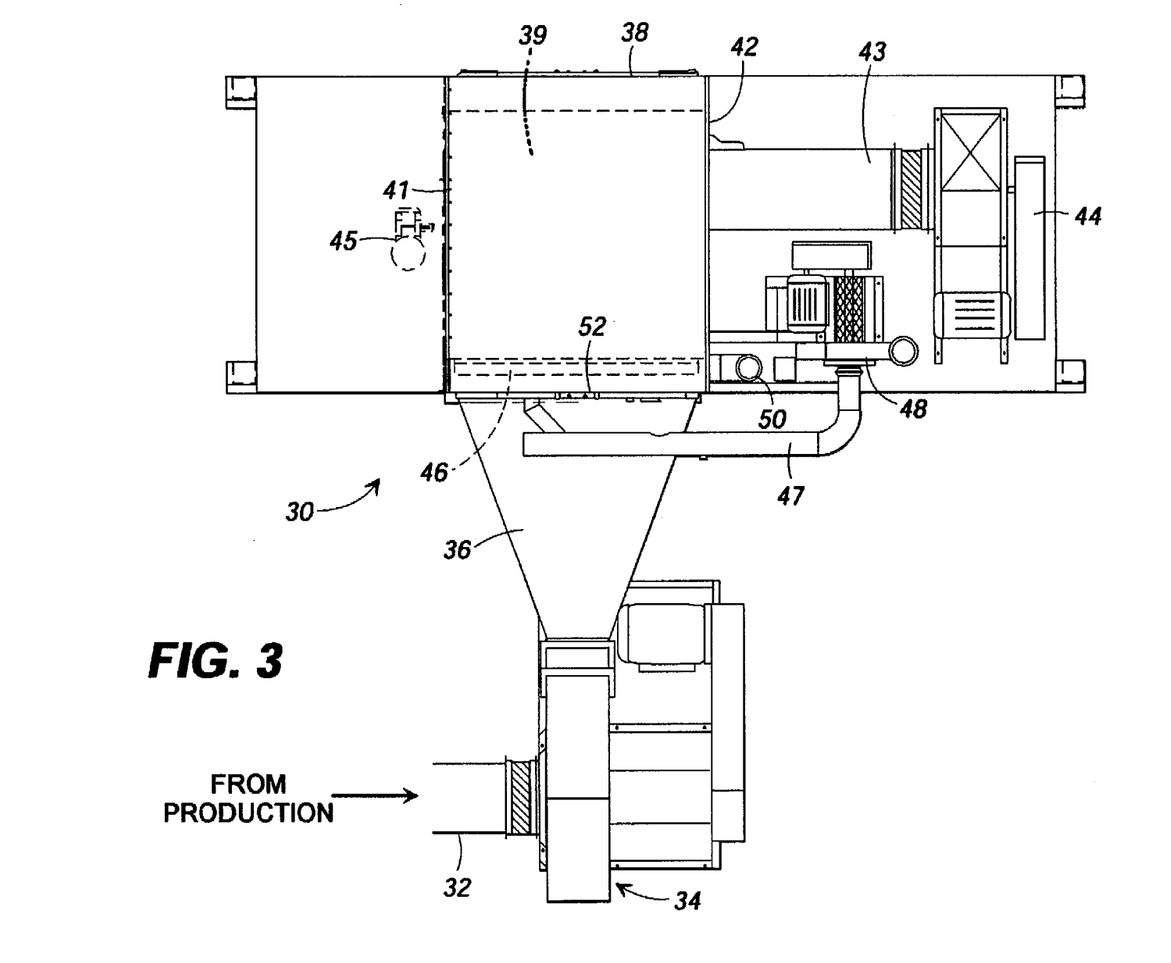
FIG. 3 is an overhead schematic drawing of the filter enclosure of FIG. 2.

A suction nozzle 46 is located along one side of the rotary drum 39 for vacuuming fluff off of the medium 40. A return conduit 47 leads from the vacuum nozzle 46 to a nozzle suction fan, or purge fan 48 (FIG. 3). The purge fan 48 and another conduit 50 are designed to route the recovered fluff 31 back to the production line.

The unique design of the forming fan transition 36 and the rounded floor 37 of the enclosure 30 provides a smooth, constant flow of air at the bottom of the enclosure 30 so that fluff 31 does not settle in the enclosure and then accumulate at the bottom of the enclosure 30. As can be seen in FIG. 2, the forming fan transition 36 preferably decreases vertically in cross sectional area and increases horizontally during that same transition (compare FIGS. 2 and 3) as the transition extends from the forming fan 34 to the enclosure 30. Preferably, the opening of the forming fan transition 36 extends along the entire length of one edge 52 of the floor. In this manner, the air blown from the fan 34 may provide turbulence across the entire cross section of the floor 37.

Although the forming fan transition 36 may fall short of extending the entire length of the edge 52 of the floor 37, or may be separated along its length, it is preferred that the transition 36 extend the entire length of the edge 52 so that there are no "dead spots" on the floor to which the flow of air cannot reach. In this manner, the chances of fluff 31 accumulating on the floor is minimized.

The curved floor 37 preferably matches the curvature of the outer surface of the rotary drum 39, at least from bottom-most portion 54 of the rotary drum to the side 38 of the enclosure opposite of the entrance of the forming fan transition 36. Thus, the distance between the floor 37 and rotary drum 39 preferably remains somewhat the same from the bottom 54 of the drum to the point where the floor ends.

In the embodiment shown in FIG. 2, the forming fan transition 36 is shown as entering slightly above the bottom of the enclosure 30. This positioning of the forming fan transition 36 is ideal for reinforcing the bottom corners 56, 58 of the enclosure 30 and removes the opening for the forming fan transition 36 from these corners 56, 58 so that the reinforcement will not be compromised. However, it is to be understood that the forming fan transition 36 may enter at the bottom of the enclosure, and the floor 37 may extend somewhat horizontally from the edge 52 to a position where the floor reaches a point which is beneath the rotary drum 39. Preferably, this point would be approximately directly below the bottom 54 of the rotary drum 39, but the curvature may start at any location between that location and a position which is closer to the side 38 of the enclosure 30.

The distance between the floor 37 and the rotary drum 39 is preferably minimized so that air flow of fluff 31 continues from the forming fan transition 36, around the bottom and right-hand sides (FIG. 2) of the rotary drum, and upward into the top portion 60 of the enclosure above the rotary drum. Likewise, the distance of the rotary drum 39 to the side walls is minimized, so that the fluff will not fall back down along the sides of the drum and back to the bottom of the floor. To further reduce possible places where fluff 31 may fall to the floor 37, the rotary drum 39 is designed to extend the entire length of the drum filter enclosure 30. Thus, the rotary drum filter enclosure 30 and the rotary drum 39 are preferably positioned so that the majority of the volume of the enclosure not including the rotary drum is located above the rotary drum.

In normal operation of the drum filter enclosure 30, the fluff 31 from the forming fan 34: (1) enters the enclosure from the forming fan transition 36; (2) moves along the floor 37; and (3) is blown upward into the upper volume 60 of the enclosure 30. Preferably, the fluff 31 floats in this volume 60 until it settles on the filter medium 40. However, as can be understood from the foregoing description, fluff falling back to the bottom floor will be blown back up to the top by the air stream formed by the unique shape of the forming fan transition 36 and the floor 37.

Various manufacturers set different "lower flammability limits ("LFL")" for their drum filter enclosures. An example of such a limit would be 75 grams of fluff per cubic meter of volume in the enclosure. This is considered the lowest concentration of fluff 31 that may be safely in the enclosure 30 at any one period of time. This limit includes accumulation at the bottom of the floor, and may or may not include fluff 31 which has accumulated on the filter medium. By calculating the volume of the enclosure which handles the fluff, the amount of fluff which may be in this section at any one time may be determined. Assuming the volume of the enclosure less the volume of drum is 8 cubic meters, and the LFL is 75 grams/$M^3$, then 600 grams (1.32 pounds) of fluff could be in the enclosure at any one time. Assuming a safety factor of four (to assure that the LFL is never reached, one-fourth of the LFL is a target concentration required by most NFPA regulations), only 0.33 pounds of fluff is allowed within the filter enclosure 30 at one time.

If the manufacturer calculates the LFL without including the amount of fluff located on the medium 40, then the present invention can easily meet this requirement, because no material accumulates on the floor, and the fluff 31 has a tendency to accumulate on the medium 38 as soon as it enters the filter enclosure 30. However, if the amount of fluff 31 on the filter medium 40 is included in the calculation, then the amount of time which the fluff 31 remains on the filter medium, or the speed at which the fluff is removed, must be taken into account. Because almost all fluff 31 attaches to the filter medium 40 as the rotary drum 39 rotates, and the fluff 31 is removed only when it reaches the suction nozzle 46, then the mount of fluff on the medium at any given time is equal to the amount of fluff that enters the enclosure 30 during one the rotation of the drum 39. In prior art devices, the drum 39 rotates at approximately one revolution per minute. Assuming that 1 pound of fluff 31 is entering the enclosure 30 per minute from the forming fan transition 36, then the drum speed of the filter must be at least:

$$\frac{1.0 \text{ lbs./Minute}}{.33 \text{ lbs.}} = 3.03 \text{ Revolutions/Minute}$$

If the drum 39 were allowed to turn slower than this, then more than 0.33 lbs. of fluff 31 would accumulate on the filter medium 40 before the fluff would be removed by the suction nozzle 46. By increasing the speed of the rotary drum rotation, the particles located on the outside of the medium 40 are removed by the suction nozzle 46 before more than 0.33 lbs is accumulated. As a safety factor, the rotation of the drum could be increased to five revolutions per minute. This results in a dust load on the drum of 0.20 lbs., which allows for an additional 0.13 lbs. of accumulation within the enclosure 30. Increasing the rotation speed of the rotary drum 39 may require a larger motor 45 or corresponding change in a gear reducer (not shown) from those used on models which turn approximately one revolution per minute, as is known in the art.

Figure 4:
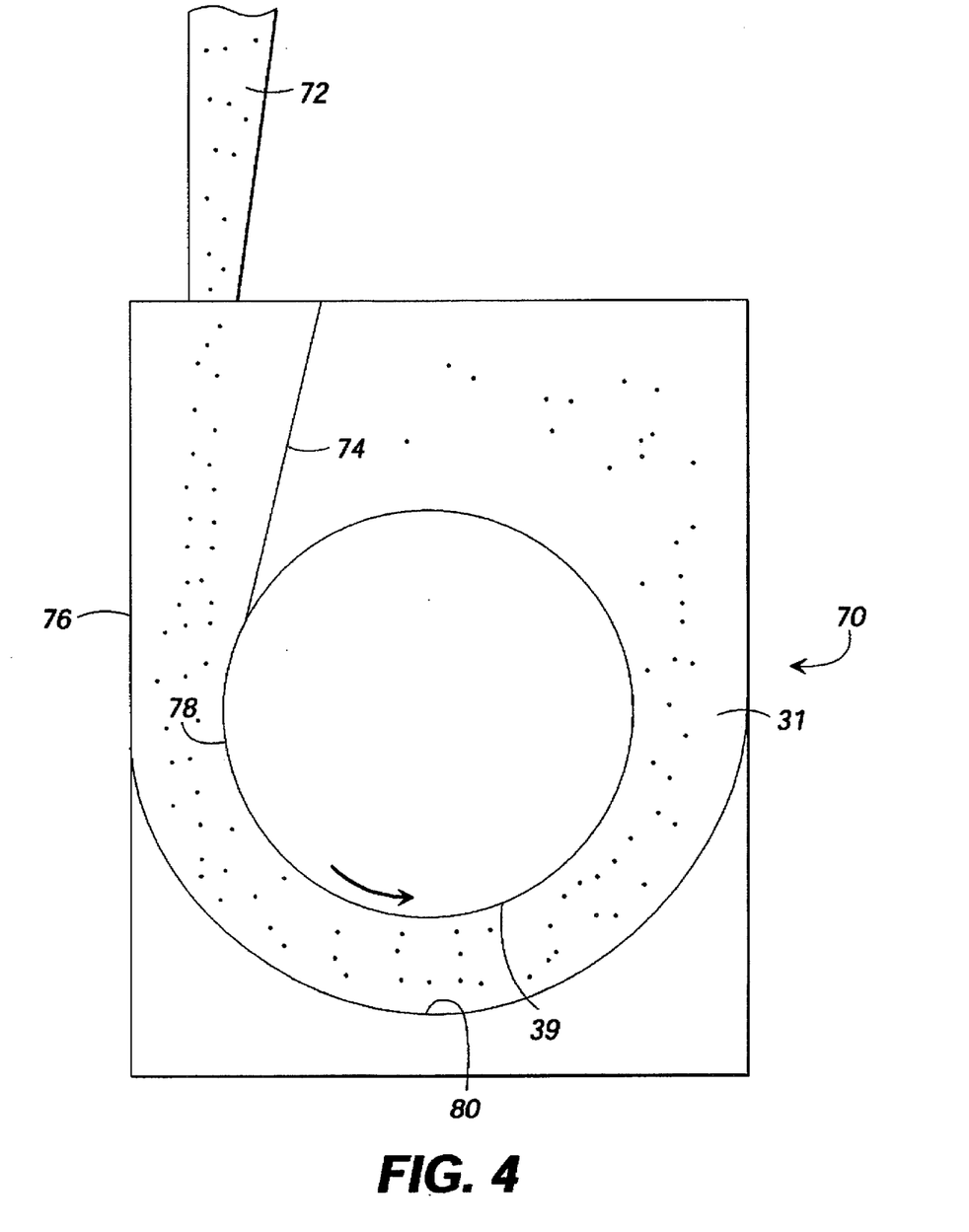
FIG. 4 is a side schematic drawing of a rotary drum filter according to another embodiment of the present invention.

A second embodiment of a drum filter enclosure 70 embodying the present invention is set forth in FIG. 4. As can be seen in FIG. 4, the conduit, or forming fan transition 72 is located at the top of the enclosure 70 instead of along the bottom. Preferably, this forming fan transition 72 extends the length of the enclosure as in the previous embodiment. A baffle 74 is located at a position where it extends substantially parallel to the flow of air and fluff 31 leading from the forming fan transition 72 and such that the flow is directed between a first side 76 of the enclosure 70 and a first side 78 of the rotary drum 39. As in the previous embodiment, The floor 80 of the enclosure 70 is rounded, or crowed, so as to direct the stream of air and particulate around the drum and back up to the top of the enclosure 30. The baffle 74 also blocks the particulate from continuing the path around the enclosure 70.

The present invention provides a drum filter enclosure which reduces the amount of fluff which remains in the enclosure during operation. The rotation of the drum is increased to match the fluff volume flowing into the enclosure. The volume of the enclosure and the mass flow rate of fluff coming into the enclosure are taken into account when determining a proper speed for the rotary drum so that fluff build up on the filter medium is reduced. As can be understood from the foregoing description, by calculating: the proper drum rotation speed based upon (1) the volume of the enclosure 30 and (2) the amount of fluff 31 entering the enclosure, the enclosure may maintain a concentration of fluff 31 within the enclosure which is well below the LFL. In addition, the volume of the enclosure may be increased (preferably in the upper volume 60 section of the enclosure), or may be designed larger so that a lower drum speed may be required. By calculating the proper drum rotation speed and structuring the enclosure 30 in this manner, an enclosure 30 may be designed such that an explosion vent is not required. By properly balancing these three items, fluff may be removed from the filter enclosure at a rate which is equal to or greater than the rate at which the fluff enters the enclosure. The suction nozzles actually clean the filter medium faster than the fluff can accumulate on the outside of the medium.

The present invention also provides a filter enclosure 30 with no "dead spots", or places where fluff 31 can accumulate within the filter. The accumulation of fluff 31 in the enclosure 30 is avoided by the structure of this invention, such as the forming fan transition 36 which extends along the length of one edge of the floor and the crowed floor 37. The structure of the forming fan transition 36 causes the incoming air and fluff to be distributed over the entire width of the floor 37, so that smooth, constant air stream is created along the width of the floor. The turbulence extends up the length of the floor 37, because the floor is crowed so that there are no hard angles along the floor where dust can accumulate, and so all fluff entering the enclosure 30 is blown to the top volume 60 of the enclosure. Also, the amount of area between the sides of the filter medium 40 and the inner edges of the enclosure 30 is reduced, and excess volume in the enclosure is provided above the rotary drum. By designing the enclosure in this manner, fluff in the air filter has a tendency to remain airborne or to settle on the medium before it returns to the floor. It can be understood that such a configuration would avoid unnecessary down time in cleaning the filter, as well as furthering the objective of maintaining the concentration of the fluff 31 within the enclosure 30 below the target LFL.

While this invention has been described in detail with particular reference to preferred embodiments thereof, it will be understood that variations and modifications can be affected within the spirit and scope of the invention as described hereinbefore and as defined in the appended claims. For example, the drum filter enclosure may be used in any industry or application in which fiberized particulate or dust is to be separated from conveying air. Also, it is possible to rim the system without the forming fan 34, as long as the main system fan 44 can maintain the enclosure 30 at a proper negative pressure, and an adequate air flow from the processing line to the main fan may be maintained.

What is claimed is:

1. A method of operating a filter for separating a particulate from conveying air, the filter comprising:

an enclosure defining a width, a length, a first side, a second side, a top side, and a floor therein, the floor defining an edge along the length of the first side of the enclosure;

a rotary drum contained within the enclosure and extending along the length of the enclosure, the rotary drum defining an outer circumference, the outer circumference defining a first side adjacent the first side of the enclosure, a second side adjacent the second side of the enclosure, a bottom located adjacent to the floor of the enclosure, and a top located adjacent the top of the enclosure; and a filter medium located on the outer surface of the rotary drum; the method comprising the steps of:
rotating the rotary drum;
depositing a particulate and air mixture into the enclosure at a flow volume having a substantially constant maximum flow rate of particulate;
drawing the air in the air and particulate mixture from a conduit, through the filter medium on the rotary drum, and out of the enclosure;
determining a maximum amount of particulate to be in the enclosure at one time;
calculating the first amount of time the first fan takes to deposit the maximum amount of particulate at the maximum flow rate of the particulate;
adjusting the means for rotating the rotary drum such that the drum makes at least one complete rotation during the first amount of time; and
removing the particulate from the filter medium on the rotary drum with a suction nozzle.

2. A filter for separating a particulate from converging air, the filter comprising:

a. an enclosure defining a width, a length, a first side, a second side, a top side, and a floor therein, the floor defining an edge along the length of the first side of the enclosure and having a concave shape between the first side of the enclosure and the second side of the enclosure;

b. a rotary drum contained within the enclosure and extending along the length of the enclosure, the rotary drum defining an outer circumference, the outer circumference defining a first side adjacent the first side of the enclosure, a second side adjacent the second side of the enclosure, a bottom located adjacent to the floor of the enclosure, and a top located adjacent the top of the enclosure, the rotary drum being spaced from the first side, floor, second side, and top of the enclosure;

c. a filter medium located on the outer surface of the rotary drum;

d. a conduit proximate the first side, the conduit for depositing a particulate and air mixture substantially the length of the enclosure and positioned to direct the particulate and air mixture sequentially from proximate the first side of the enclosure, toward the floor, along the floor between the floor and the bottom of the rotary drum, up the second side of the enclosure between the second side of the enclosure and the second side of the rotary drum, and above the rotary drum between the top of the rotary drum and the top of the enclosure, so that the air carries the particulate from the conduit, around the rotary drum to the top of the rotary drum without the particulate accumulating against the enclosure;

e. a first fan for drawing the air in the air and particulate mixture from the conduit through the filter medium on the rotary drum, and out of the enclosure; and f. a suction nozzle located proximate the first side of the outer circumference of the rotary drum for removing the particulate from the filter medium on the rotary drum.

3. The filter enclosure of claim 2, further comprising a second fan located on the conduit for depositing the air and particulate mixture at a flow volume.

4. The filter enclosure of claim 2, wherein the conduit deposits the particulate and air mixture into the enclosure adjacent to the edge of the floor.

5. The filter of claim 2 wherein the concave shape of the floor extends from a first location below the bottom of the outer circumference of the rotary drum to a second location on the second side of the enclosure which is adjacent to the second side of the outer circumference of the rotary drum.

6. A filter for separating a particulate from conveying air, the filter comprising:

a. an enclosure defining a width, a length, a first side, a second side, a top side, and a floor therein, the floor defining an edge along the length of the first side of the enclosure and having a concave shape between the first side of the enclosure and the second side of the enclosure;

b. a rotary drum contained within the enclosure and extending along the length of the enclosure, the rotary drum defining an outer circumference, the outer circumference defining a first side adjacent the first side of the enclosure, a second side adjacent the second side of the enclosure, a bottom located adjacent to the floor of the enclosure, and a top located adjacent the top of the enclosure, wherein the concave shape of the floor extends from a first location below the bottom of the outer circumference of the rotary drum to a second location on the second side of the enclosure which is adjacent to the second side of the outer circumference of the rotary drum and the floor is separated from the outer circumference of the rotary drum a substantially constant distance from the first location to the second location;

c. a filter medium located on the outer surface of the rotary drum;

d. a conduit for depositing a particulate and air mixture substantially the length of the enclosure; and e. a first fan for drawing the air in the air and particulate mixture from the conduit through the filter medium on the rotary drum, and out of the enclosure.

7. The filter of claim 2, wherein the rotary drum extends substantially the entire length of the enclosure.

8. A filter for separating a particulate from conveying air, the filter comprising:

a. an enclosure defining a width, a length, a first side, a second side, a top side, and a floor therein, the floor defining an edge along the length of the first side of the enclosure;

b. a rotary drum contained within the enclosure and extending along the length of the enclosure, the rotary drum defining an outer circumference, the outer circumference defining a first side adjacent the first side of the enclosure, a second side adjacent the second side of the enclosure, a bottom located adjacent to the floor of the enclosure, and a top located adjacent the top of the enclosure, wherein a first distance between the top of the outer circumference of the rotary drum and the top of the enclosure is substantially greater than a second distance between the second side of the outer circumference of the rotary drum and the second side of the enclosure;

c. a filter medium located on the outer surface of the rotary drum;

d. a conduit for depositing a particulate and air mixture substantially the length of the enclosure; and e. a first fan for drawing the air in the air and particulate mixture from the conduit through the filter medium on the rotary drum, and out of the enclosure.

9. The filter of claim 8, wherein the first distance is more than twice the second distance.

10. The filter of claim 9, wherein the first distance is substantially greater than a third distance between the first side of the rotary drum and the first side of the enclosure.

11. The filter of claim 10, wherein the first distance is more than twice the third distance.

12. A filter for separating a particulate from conveying air, the filter comprising:

a. an enclosure defining a width, a length, a first side, a second side, a top side, and a floor therein, the floor defining an edge along the length of the first side of the enclosure, the floor shaped so as to be concave;

b. a rotary drum contained within the enclosure and extending along the length of the enclosure, the rotary drum defining an outer circumference, the outer circumference defining a first side adjacent the first side of the enclosure, a second side adjacent the second side of the enclosure, a bottom located adjacent to the floor of the enclosure, and a top located adjacent the top of the enclosure, wherein the floor extends from a first location below the bottom of the outer circumference of the rotary drum to a second location on the second side of the enclosure which is adjacent to the second side of the outer circumference of the rotary drum and the floor is separated from the outer circumference of the rotary drum a substantially constant distance from the first location to the second location;

c. a filter medium located on the outer surface of the rotary drum;

d. a conduit for depositing a particulate and air mixture substantially the length of the enclosure;

e. a first fan located on the conduit for depositing the particulate and air mixture into the enclosure;

f. a second fan for drawing the air in the air and particulate mixture from the conduit, through the filter medium on the rotary drum, and out of the enclosure; and g. a suction nozzle located proximate the first side of the outer circumference of the rotary drum for removing the particulate from the filter medium on the rotary drum.

13. A filter for separating a particulate from conveying air, the filter comprising:

a. an enclosure defining a width, a length, a first side, a second side, a top side, and a floor therein, the floor defining an edge along the length of the first side of the enclosure, the floor shaped so as to be concave;

b. a rotary drum contained within the enclosure and extending along the length of the enclosure, the rotary drum defining an outer circumference, the outer circumference defining a first side adjacent the first side of the enclosure, a second side adjacent the second side of the enclosure, a bottom located adjacent to the floor of the enclosure, and a top located adjacent the top of the enclosure, wherein a first distance between the top of the outer circumference of the rotary drum and the top of the enclosure is substantially greater than a second distance between the second side of the outer circumference of the rotary drum and the second side of the enclosure;

c. a filter medium located on the outer surface of the rotary drum;

d. a conduit for depositing a particulate and air mixture substantially the length of the enclosure;

e. a first fan located on the conduit for depositing the particulate and air mixture into the enclosure;

f. a second fan for drawing the air in the air and particulate mixture from the conduit, through the filter medium on the rotary drum, and out of the enclosure; and g. a suction nozzle located proximate the first side of the outer circumference of the rotary drum for removing the particulate from the filter medium on the rotary drum.

14. The filter of claim 13, wherein the first distance is more than twice the second distance.

15. The filter of claim 13, wherein the first distance is substantially greater than a third distance between the first side of outer circumference of the rotary drum and the first side of the enclosure.

16. The filter of claim 15, wherein the first distance is more than twice the third distance.

* * * * *